United States Patent [19]

Onnenberg et al.

[11] Patent Number: 4,875,843
[45] Date of Patent: Oct. 24, 1989

[54] VACUUM MOLD FOR MANUFACTURING CUSHIONS WITH BACK-FOAMED COVERS

[75] Inventors: Volker Onnenberg, Wiehl; Günter Möllmann, Hagen, both of Fed. Rep. of Germany

[73] Assignees: Fritsche-Mollmann GmbH & Co., Lotte; Bayer Aktiengesellschaft, Leverkusen, both of Fed. Rep. of Germany

[21] Appl. No.: 243,868

[22] Filed: Sep. 13, 1988

[30] Foreign Application Priority Data

Sep. 23, 1987 [DE] Fed. Rep. of Germany ....... 3731994

[51] Int. Cl.[4] .......................... B29C 45/14; B32B 5/18
[52] U.S. Cl. .................................... 425/4 R; 264/46.5; 264/46.8; 264/DIG. 64; 264/DIG. 78; 249/96; 425/117; 425/387.1; 425/388
[58] Field of Search .................... 264/46.5, 46.6, 46.8, 264/291, 292, DIG. 64, DIG. 78; 425/112, 126.1, 387.1, 388, 504, DIG. 48, DIG. 60, 117, 127, 4 R, 817 R; 249/83, 96

[56] References Cited

U.S. PATENT DOCUMENTS

| | | | |
|---|---|---|---|
| 3,655,840 | 4/1972 | Krug | 264/46.8 |
| 3,943,215 | 3/1976 | Grüne et al. | 264/46.6 |
| 4,117,068 | 9/1978 | Miller | 264/130 |
| 4,759,700 | 6/1988 | Onnenberg et al. | 425/4 R |

FOREIGN PATENT DOCUMENTS

| | | | |
|---|---|---|---|
| 33116 | 8/1981 | European Pat. Off. | |
| 3034973 | 3/1982 | Fed. Rep. of Germany | |
| 55-107436 | 8/1980 | Japan | 264/46.8 |
| 1521063 | 8/1978 | United Kingdom | |

Primary Examiner—Jay H. Woo
Assistant Examiner—K. P. Nguyen
Attorney, Agent, or Firm—Gene Harsh; Joseph C. Gil

[57] ABSTRACT

The invention relates to a vacuum mold for manufacturing cushions with back-foamed covers, wherein a section of cover material is stretched across a mold cavity, held down at the rim of the cavity, but allowed to slide into the mold cavity under the influence of a vacuum. The cover is also placed against and fitted to contourings (ridges and/or grooves) of the mold cavity, and subsequently back-foamed. The resulting flexible foam core is allowed to harden and the finished cushion is removed from the form.

4 Claims, 2 Drawing Sheets

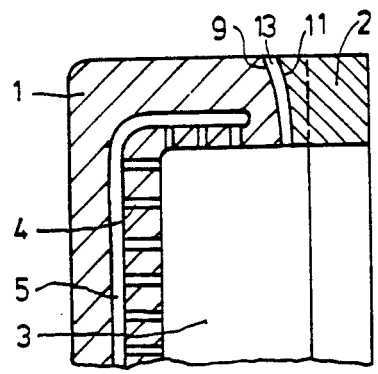
FIG. 4 (A-B)
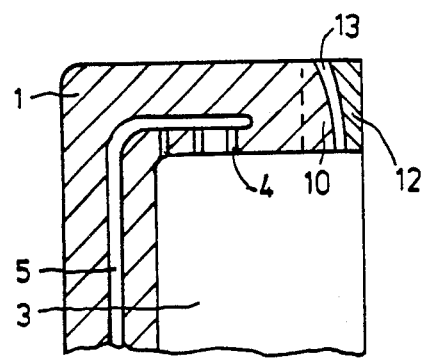
FIG. 5 (C-D)
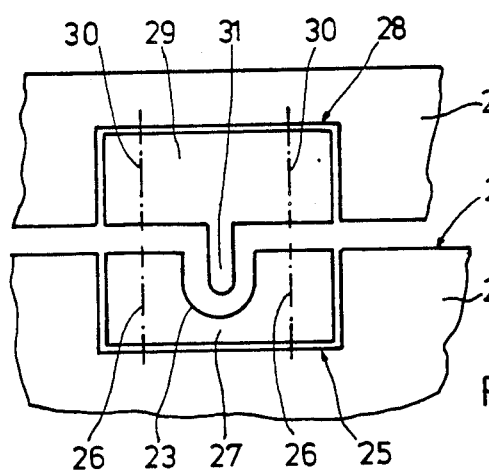
FIG. 6

VACUUM MOLD FOR MANUFACTURING CUSHIONS WITH BACK-FOAMED COVERS

BACKGROUND OF THE INVENTION

The invention relates to a process and a vacuum mold for manufacturing cushions with back-foamed covers, wherein a section of cover material is stretched across a mold cavity, held down at the rim of the cavity, but allowed to slide into the mold cavity under the influence of a vacuum. The cover is also placed against and fitted also to contourings (ridges and/or grooves) of the mold cavity, and subsequently back-foamed. The resulting flexible foam core is allowed to harden and the finished cushion is removed from the form.

Cushions, and in particular seat upholstery for motor vehicles, often have contourings, for example, longitudinal or lateral ridges, or longitudinal or lateral grooves.

Difficulties are repeatedly experienced in placing the section of cover material with its full surface against such contourings while drawing the cover into the mold cavity. Undesired creases or incompletely foamed areas result during back-foaming.

The object of the present invention consists in creating a process and a vacuum mold with which the full-surface contact of the section of cover material against the contourings of the mold cavity is facilitated.

BRIEF DESCRIPTION OF THE DRAWINGS

FIG. 4 shows a section through line A–B in FIG. 1,

FIG. 5 shows a section through line C–D in FIG. 1 and

FIG. 6 shows the arrangement of a contouring of the rim in one insert and the arrangement of the associated contouring of the tenter in one insert.

DESCRIPTION OF THE INVENTION

Figure 1:
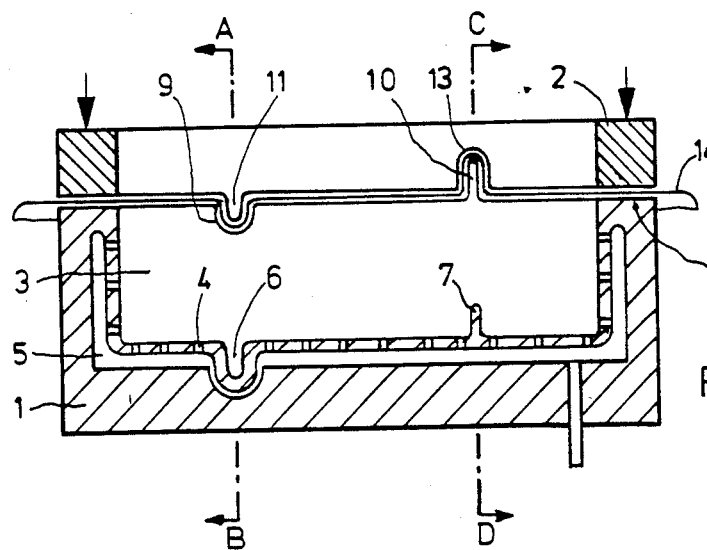
FIG. 1 shows a section through a vacuum mold with tenter.

The above object is solved in that the cover material is at least approximately fitted to the contourings of the mold cavity in the region of the rim of the cavity and the tenter (or stretching frame).

By this means, the contourings are already roughly preformed before the cover material slides into the mold cavity. The creases or bulges formed in the section of cover material by the corresponding contourings of the rim and tenter are continued in the section of cover material located above the mold cavity. These deformations are for the most part preserved during drawing in and are subjected to the appropriate fine deformation during application to the contourings of the mold cavity. Besides the avoidance of undesired creases and undesired hollow regions in the finished cushion, the drawing-in process is also accelerated.

The lower half of the mold comprises a mold cavity with pronounced longitudinal contourings (ridges and-/or grooves). The cavity is surrounded by a rim, and a tenter (or stretching frame) is assigned to the rim.

The novelty consists in that (i) contourings (which are appropriate to and run in the direction of the contourings of the mold cavity) are provided on the rim or in the rim and (ii) the tenter has negative contourings corresponding to the same contourings of the rim.

There are no great problems in providing appropriate contourings in the rim and in the tenter. They may be formed in or formed on the rim or tenter. Of course, a gap for receiving the cover material must be present between the contourings of the rim and the associated negative contourings of the tenter.

The contourings are preferably provided in exchangeable insert pieces. This is particularly advantageous if different sections of cover material of varying thickness must be processed. In this case, the gap formed by the contourings may be appropriately dimensioned by the exchange of such inserts.

According to a further special embodiment the contourings broaden outwards and flatten out in the process. By this means the deformation of the section of cover material is facilitated during drawing-in.

A further, especially advantageous embodiment is characterized in that the gap formed between the contourings of the rim and of the tenter tapers towards the mold cavity. By this measure, the drawing-in process is optimized by a better guiding of the section of cover material.

The new vacuum mold is represented purely schematically in the drawing.

Figure 2:
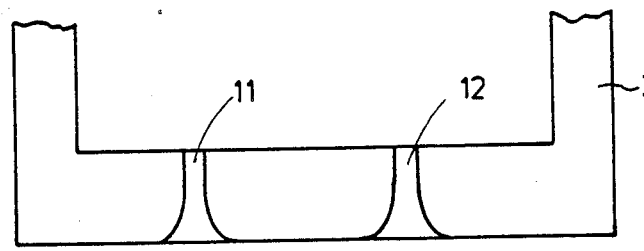
FIG. 2 shows a top view of the working side of the tenter.
Figure 3:
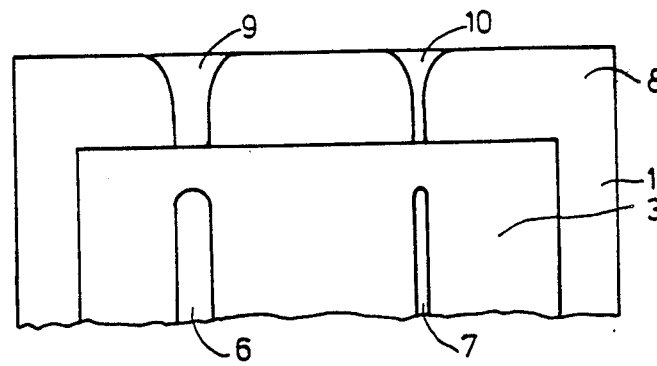
FIG. 3 shows a top view of the lower half of the mold without tenter.

In FIGS. 1 to 5 the vacuum molded consists of a lower half 1 of the mold, to which a tenter 2 and an upper half of the mold (not represented) are associated. A mold cavity 3 is arranged in the half 1 of the mold, which cavity is connected by channels 4 to a vacuum chamber 5, which is connected to a vacuum pump (not represented). Contourings 6, 7 are arranged on the base of the mold cavity 3. Contour 6 is in the shape of a groove while contour 7 is in the shape of a ridge. These contourings 6, 7 are continued at the rim 8 encircling the mold cavity 3 as contourings 9 (groove) and 10 (ridge), and at the tenter 2 as corresponding negative contourings 11 and 12. These contourings 9, 10, 11, 12 flatten outwards, and the gap 13 formed between them increases outwards. A section 14 of cover material is represented in its stretched state.

Mold half 21 and tenter 22 are represented in section in FIG. 6. The contouring 23 of the rim 24 is arranged in an insert 27 exchangeably attached with screws 26 in a recess 25 of the rim 24. A recess 28, in which an insert 29 is exchangeably attached by means of screws 30, which insert comprises the contouring 31, is arranged in the tenter 22 in identical fashion.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A vacuum mold for manufacturing a cushion with a back-foamed cover, said mold comprising an upper mold half and a lower mold half, said lower mold half comprising a mold cavity having longitudinal contours and being connected to a vacuum source such that when a vacuum is applied, said cover is pulled into said cavity, wherein said cavity is surrounded by a rim, said rim having contours thereon running the same direction as the contours in said mold cavity, and wherein a tenter is associated with said rim, said tenter having negative contours corresponding to the contours on said rim, and wherein said tenter is adapted to hold down said cover on said rim while at the same time allowing said cover to slide upon application of vacuum to said cavity.

2. The mold of claim 1, wherein the contours on said rim and on said tenter are arranged on inserts which are mountable on said rim and said tenter.

3. The mold of claim 1, wherein the contours on said rim and on said tenter broaden outwards and flatten out.

4. The mold of claim 1, wherein a gap is provided between the contours of the rim and the contours of the tenter, and wherein said gap tapers towards the mold cavity.

* * * * *